A. W. Cox,

Comb'd Knife & Fork.

No. 88,370.  Patented Mar. 30, 1869

Witnesses
E. Wolff
John F. Brooks

Inventor
A. W. Cox.
pr. Munn & Co
Attorneys.

ARTHUR W. COX, OF MALDEN, MASSACHUSETTS.

Letters Patent No. 88,370, dated March 30, 1869.

IMPROVEMENT IN COMBINED KNIFE AND FORK.

The Schedule referred to in these Letters Patent and making part of the same.

*To all whom it may concern:*

Be it known that I, ARTHUR W. COX, of Malden, in the county of Middlesex, and State of Massachusetts, have invented a new and improved Combined Knife and Fork; and I do hereby declare that the following is a full, clear, and exact description thereof, which will enable others skilled in the art to make and use the same, reference being had to the accompanying drawings, forming part of this specification.

The object of this invention is to provide a combined knife and fork, better adapted for the double use than any now made.

Similar letters of reference indicate corresponding parts.

Figure 1:
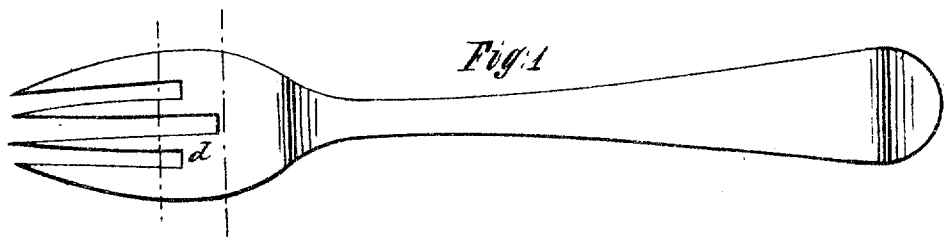
Figure 1 represents a plan view of the back of my improved implement.
Figure 2:
Figures 2 and 3 represent transverse sections.
Figure 3:

I make the body of a common table-fork, at the base of the tines $a$, considerably broader than as ordinarily constructed, and also the outside tines at the said base, tapering them to a point, and reducing the edges of the base and the outer tines to a knife-edge, shaping the front, or upper surface of the tines and the base thereof, to a plane, as represented at $b$, fig. 2, and forming the under surface of the widened portions of the tines concave, as represented at $c$.

I also make the bifurcations between the outer tines, and those next thereto, of less depth than the central bifurcation, or those of the common fork, as represented at $d$.

This arrangement greatly strengthens the outer tines, and thereby enables them to perform the functions of knives without bending under the great pressure it is sometimes necessary to impart to them.

The combined knives and forks, as heretofore constructed, have generally proved of little use as knives, in consequence of the said bifurcations being extended to the depth usually adapted for forks.

Having thus described my invention,

I claim as new, and desire to secure by Letters Patent—

The improved combined knife and fork, having the plane upper surface $b$, concave under surfaces $c$, and the slots between the outer tines and those adjacent thereto shortened, whereby they are strengthened, all substantially as specified.

ARTHUR W. COX.

Witnesses:
 JOS. W. TUFTS,
 ALBERT O. WAITT.